United States Patent

[11] 3,612,468

| [72] | Inventors | Josef K. Hoppl;<br>Helmut A. Golda, both of Lindenhurst, N.Y. |
|---|---|---|
| [21] | Appl. No. | 865,751 |
| [22] | Filed | Oct. 13, 1969 |
| [45] | Patented | Oct. 12, 1971 |
| [73] | Assignee | J. K. Hoppl Corporation<br>Lindenhurst, N.Y. |

[54] HEIGHT ADJUSTING MEANS FOR A SURGICAL MICROSCOPE
6 Claims, 6 Drawing Figs.

[52] U.S. Cl. .................................................. 248/405
[51] Int. Cl. .................................................. F16m 11/04
[50] Field of Search.......................................... 248/405, 406, 404, 161, 162, 123, 124, 125, 333

[56] References Cited
UNITED STATES PATENTS

| 678,642 | 7/1901 | Chambers | 248/405 |
| 2,299,785 | 10/1942 | Barrett | 248/405 |
| 2,678,859 | 5/1954 | Zuzzi | 248/405 |

FOREIGN PATENTS

| 1,058,716 | 6/1959 | Germany | 248/405 |

Primary Examiner—Marion Parsons, Jr.
Attorney—Joseph Weingarten

ABSTRACT: An improved surgical microscope particularly useful in ophthalmic surgery of the type comprising a base member, an adjustable support column extending upwardly therefrom and means projecting from the support column to suspend the optical components of a microscope and related auxiliary equipment above the operating area. The improvement resides in a novel arrangement of structural elements providing an adjustable support column which is advantageously integrated with other structural components of the microscope.

INVENTORS
JOSEF K. HOPPL
HELMUT A. GOLDA

ATTORNEYS

HEIGHT ADJUSTING MEANS FOR A SURGICAL MICROSCOPE

FIELD OF THE INVENTION

The invention relates in general to surgical microscopes especially suited to ophthalmic surgery and more particularly concerns a novel height adjusting support column and the integration of the novel support column with other structural elements and components of such microscopes.

DISCUSSION OF THE PRIOR ART

One of the most useful tools in diagnostic and therapeutic procedures is the surgical microscope, particularly microscopes of the type especially adapted for ophthalmic surgery. Such microscopes and their performance requirements are generally known. However, due to practical inconsistencies existing between some of the requirements, some desired characteristics are often sacrificed for the sake of other, more important, features. For example, aside from the optical requirements involved, an ophthalmic microscope should be capable of being moved easily from place to place while at the same time being stable during use in order to eliminate any possible vibration of the optical components during the medical procedure involved. Moreover, the microscope as a whole must convey a definite appearance of stability and of performance reliability in order to instill confidence in both the patient and the practitioner, thereby minimizing distractions which could impair the intense concentration required during a surgical operation. Further, it is desirable that the microscope be simple to operate and yet exhibit a high degree of reliability. However, such devices must also include means for making complicated but precise adjustments in magnification and focus of the optical components during operation. Moreover, such adjustments must be made quietly in a positive and nondistracting fashion and in a manner so as to impose minimal upon the concentration and upon the hands of the practitioner.

Reference to some of the prior art surgical microscopes indicates that none has been constructed having all of the above-described performance characteristics. For example, in many instances present surgical microscopes are bulky mechanisms mounted in a fixed relationship with an operating table or examination chair. Such a feature unduly restricts the surgical procedures for which such an instrument may be used. However, such a fixed mounting is primarily employed to assure vibration free operation of the device, which is required so that the optical components and related equipment can be continually and steadily directed at a particular focal point. Other prior art instruments are very expensive and highly complex and therefore not practical for any but the largest medical facilities. Most of the present devices are not easily portable and do not have the flexibility which would be greatly desired for a wide variety of ophthalmic procedures by a wide variety of professional users.

SUMMARY OF THE INVENTION

Broadly speaking, the present invention provides an ophthalmic microscope of a pleasant and unobtrusive appearance which is fully portable and possesses a high degree of flexibility for users. The microscope of the present invention involves a novel integration of structural elements which cooperate in a remarkably simple but efficient fashion to provide a device capable of performance consistent with a large number of practical requirements.

One of the essential factors contributing to the overall achievements and advantages of the present surgical microscope resides in the novel design of an adjustable support column and the integration of this member with other structural elements and components to present a total instrument having the desired characteristics. The height adjustable column of this microscope operates smoothly and positively to raise and lower the optical components of the microscope through the use of a relatively simple but reliable mechanism and is sturdy and stable in both performance and appearance. Moreover, the support column also functions as a means to focus the optical components of the microscope and performs this function in a remarkably simple, vibration free and positive fashion without undue impositions upon the hands or the concentration of the practitioner.

More particularly, a reversible electric motor connected to a threaded spindle is coupled to the optical component projecting means of the instrument in such a manner that the optical components may be smoothly raised and lowered through operation of a foot switch to position the microscope at the proper height above the operating area.

BRIEF DESCRIPTION OF THE DRAWING

The invention will be readily understood when the detailed description thereof is read in conjunction with the drawing, wherein.

DESCRIPTION OF THE PREFERRED EMBODIMENT

Figure 1:
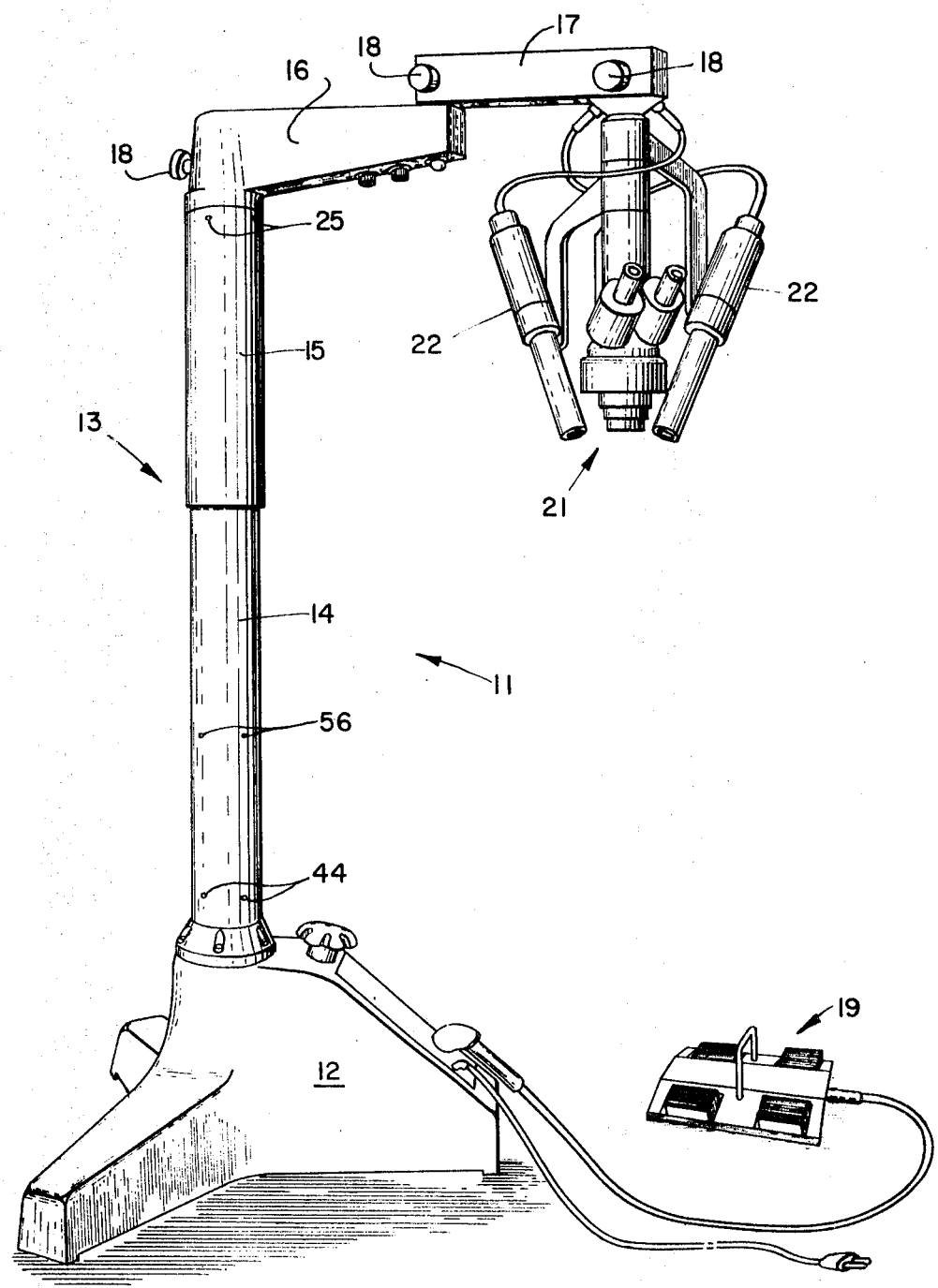
FIG. 1 is a perspective view of a surgical microscope constructed in accordance with the principles of the present invention.

Referring now to FIG. 1, there is illustrated a surgical microscope generally referred to by reference numeral 11, having a base member 12, an adjustable support column 13 comprising two telescopically connected cylindrical column members 14 and 15 extending upwardly from the base member, and projection arms 16 and 17 adapted to suspend the optical components 21 and associated lighting devices 22 above the desired operating area. Lower column member 14 is securely affixed to base member 12, by suitable means such as bolts or the like, while upper column member 15 is arranged in slidable communication with member 14. In this fashion, the overall height of support column 13 can be adjusted within certain prescribed limits. Projection arm 16 is pivotally connected to upper column member 15 while optical components 21 are pivotally mounted on projection arm 17. Projection arms 16 and 17 are also pivotally connected together. Suitable locking devices 18 are provided for securing each of the pivoted members in any desired position. Lights 22 may be twin "cool" lights angled for oblique illumination and arranged so that each light may be rotated at least 180° about the operative field, always in perfect focus with the optical components. However, the more likely configuration for microscope 11 is one cool light and one slit lamp to provide more intense illumination of a particular area. Foot control 19 is included with microscope 11 and controls the focusing and magnification of the microscope, thereby leaving the practitioner's hands free for operative purposes. It is evident from the above description that the optical and lighting components have practically unlimited freedom of movement in the immediate operating area while the base and support members are quite stable with respect to the operating room floor.

In the surgical microscope of FIG. 1, portability is provided by a novel transport mechanism using heavy duty casters which retract within base member 12. Details of this advantageous means to provide the microscope with the flexibility of movement from place to place may be found in commonly owned U.S. Pat. application Ser. No. 865,755 filed by the present inventors on even date herewith.

In the microscope of FIG. 1, focus control of optical components 21 is achieved by adjusting the overall height of support column 13. This feature is an essential factor of the present invention and contributes in large measure to the overall improved performance characteristics of the microscope as well as the reliability thereof. Not only must the focus adjustment be positive and precise, but the adjustment must be made in a smooth, vibration free fashion. Such adjustment features are essential to assure the confidence of the practitioner in the microscope. For example, loss of concentration or undesirable distractions could arise if the practitioner has reservations as to the reliability of the performance characteristics of any of the integral elements of the microscope. However, in accordance with the practice of the present invention it has been discovered that a specific means for adjusting the overall height of the microscope can be advantageously integrated with other structural components to provide an instrument of outstanding performance characteristics. The specific means and the structural elements thereof as well as the manners in which they can be arranged and combined are described in detail with reference to FIGS. 2 through 6.

Figure 2:
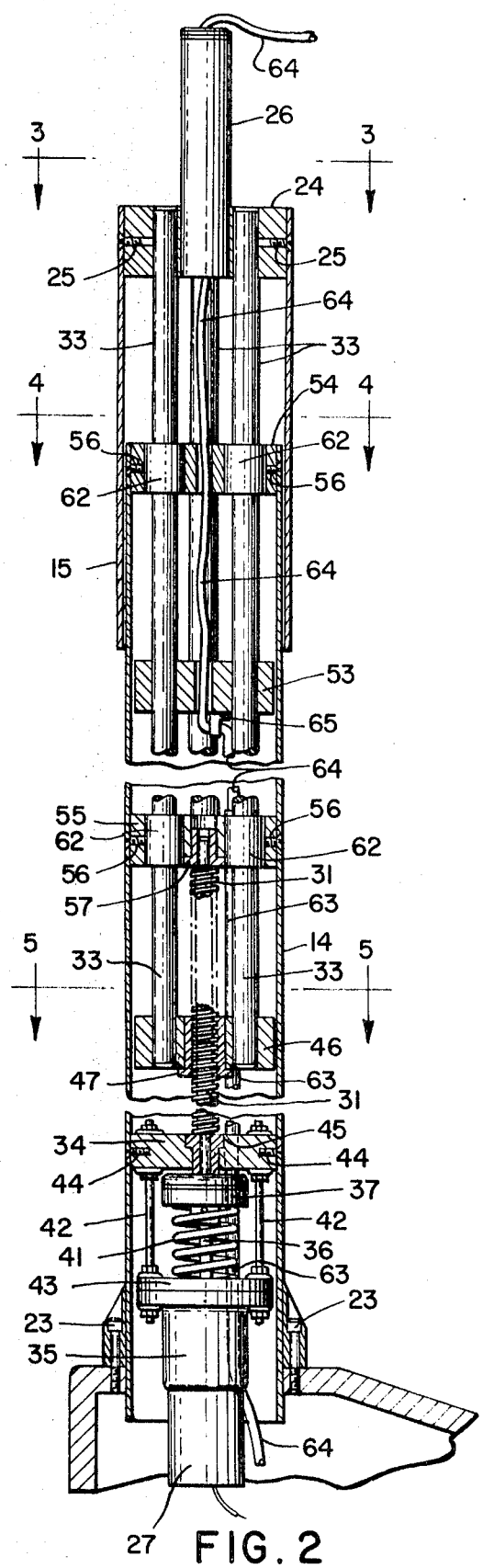
FIG. 2 is an enlarged sectional view of the adjustable support column together with integral structural elements which cooperate to adjust the overall height of the microscope of FIG. 1.
Figure 3:
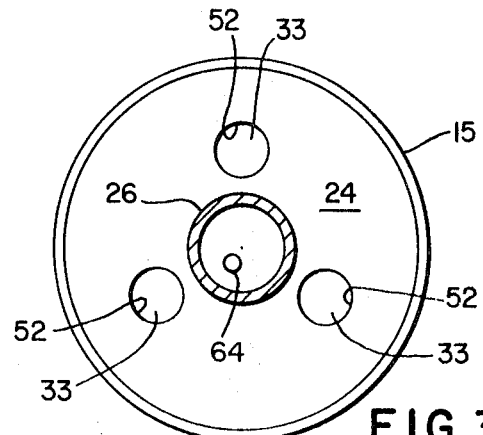
FIGS. 3, 4 and 5 are sectional views taken along cutting planes 3—3, 4—4 and 5—5 respectively of FIGS. 2.
Figure 4:
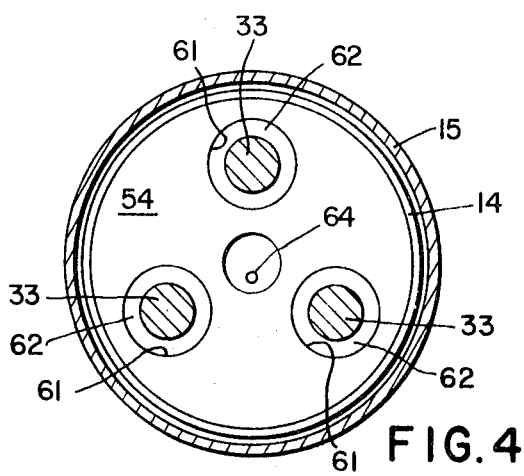
Figure 5:
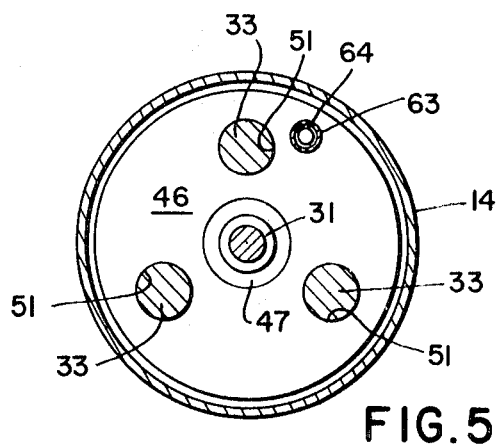
Figure 6:
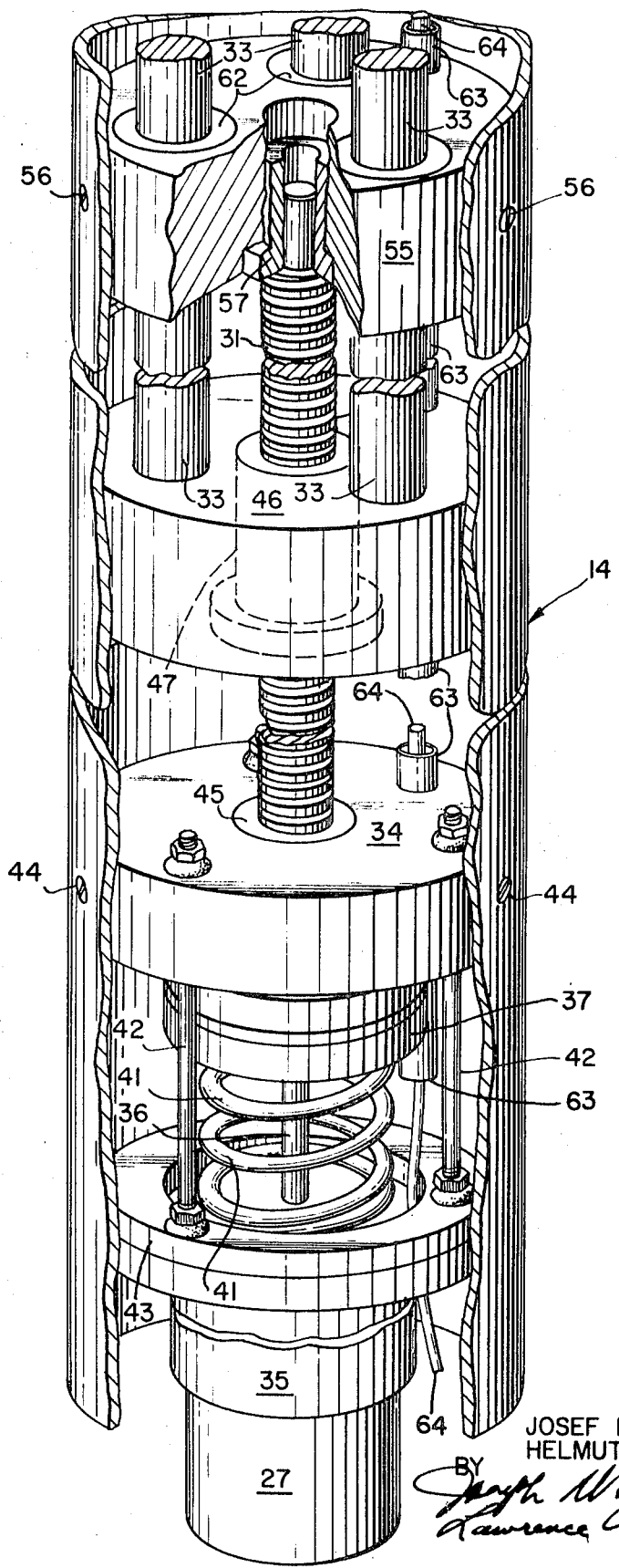
FIG. 6 is a pictorial partial cutaway view of the lower portion of the height adjusting mechanism of the present invention.

Support column 13 is shown in section in FIG. 2. This member includes an exterior tubular housing comprising lower and upper column members 14 and 15 respectively, which are shown arranged coaxially in slidable communication with respect to each other. Lower member 14 is securely attached to base member 12 by means of bolts 23. End plate 24 is secured within the upper end of column member 15 by suitable means such as screws 25 and cylinder 26 is fixed within a hole in the center of the end plate in any convenient manner. Cylinder 26 provides means to rotatably attach projection arm 16, shown in FIG. 1, to adjustable support column 13.

The entire top of the microscope, including optical components 21, lights 22, projecting arms 16, 17 and upper column member 15 may be raised and lowered as desired by the proper operation of the mechanism housed within column 13. This mechanism generally comprises motor 27, threaded spindle 31, actuator plate 32, end plate 24 and rods 33. Although the microscope may be vertically adjusted through any practicable distance, the embodiment described herein will be assumed to have an adjustment range of about 14 inches.

More specifically, motor 27 is secured to mounting plate 34 within a column member 14 near the bottom thereof. Several elements are included within the bottom of column 13 which are associated with the motor and the mounting thereof. An example of a specific motor which is suitable for use in this invention is a 1/70-hp. reversible AC induction motor operating at 1,675 r.p.m. through a gear reducer 35 to produce an output shaft speed of approximately 71 r.p.m. Motor shaft 36 is coupled to one side of friction clutch 37 while the other side of the clutch is secured to the bottom end of spindle 31. Surrounding motor shaft 36 between clutch 37 and gear reducer 35 is compression spring 41. The amount of pressure exerted upon clutch 37 is governed by mounting bolts 42 which secure the motor to mounting plate 34. Rubber shock absorbers are located on bolts 42 on either side of mounting plate 34 and on either side of motor bracket 43. These devices absorb substantially all of the vibration which might be produced by motor 27 which could otherwise be transmitted to the optical and lighting components at the top of the microscope.

Mounting plate 34 is secured to column member 14 by means of screws 44 and has ball bearing 45 mounted in the center thereof. This bearing also acts as a thrust bearing for spindle 31 since it bears the entire weight of the top of the microscope. Above mounting plate 34 is actuator plate 46 which is slightly smaller than the inner diameter of column member 14 so that it may move freely in a longitudinal direction therein. A hole in the center of the actuator plate is fitted with an actuator nut 47 which has internal threads which mesh with the threads on spindle 31. As an example, the spindle and actuator nut may be formed with standard acme threads at a pitch of 10 threads per inch. Actuator plate is also formed with three bores 51 in which are secured, by suitable means, the lower ends of rods 33. The upper ends of rods 33 are firmly anchored in bores 52 in end plate 24. It is apparent that actuator plate 46, rods 33, end plate 24 and column member 15 form a rigid structure which is raised and lowered as spindle 31 is rotated in one direction or the other. This action, of course, is transmitted to the optical and lighting components of the microscope since the top of the instrument is pivotally mounted on column member 15.

Several important elements are located within column member 14 to insure that the microscope operates smoothly and without twisting or unacceptable vibration. In order to prevent any trace of twisting of the three long rods 33, stabilization plate 53 is secured to each of the rods and is somewhat smaller than the inner diameter of column member 14 so that it is freely movable in the longitudinal direction therein. Rods 33 are thereby maintained in the desired relationship throughout their entire length. If the rods are very long, more stabilization plates may be added as needed. Bearing plates 54, 55 are located respectively above and below stabilization plate 53. These bearing plates are secured to the wall of column member 14 by means of screws 56 and provide friction reducing bearings for the vertical travel of the rods as well as serving to define the vertical range through which the microscope may move. The upper limit is reached when stabilization plate 53 reaches bearing plate 54 and the lower limit is governed by the placement of bearing plate 55. Of course, the distance between the bearing plates will normally be substantially equal to the distance between mounting plate 34 and bearing plate 55 in order to allow for the full vertical movement of actuator plate 46. And for reasons of appearance, upper column member 15 should be at least slightly longer than the distance between bearing plates so that even at the highest position, column member 15 overlaps column member 14. Bearing plate 55 is also provided with bushing 57 for guidance of the upper end of spindle 31. Both nut 47 bushing 57 are preferably permanently lubricated oil impregnated bronze.

Bearing plates 54, 55 are formed with three bores 61 which are substantially larger than rods 33. Between rods 33 and bores 61 are mounted bushings 62 having a series of "racetrack" ball bearing members. Rods 33 are thereby carefully channeled for smooth vertical movement. The ball bearings provide essentially friction-free longitudinal motion of the rods so that the only significant force to be contended with by motor 27 is the force of gravity acting upon that portion of the microscope which is raised and lowered.

It is thus evident by inspection of the structure of support column 13 that distances between certain members within this column must be carefully defined with respect to each other. For example, given a desired range of vertical adjustment of the optical components of the microscope of about 14 inches, the distance between mounting plate 34 and bearing plate 55, both of which are secured to column member 14, must be about 14 inches. This is governed by the fact that actuator plate 32, which is between mounting plate 34 and bearing plate 55, is secured to rods 33 which move up and down through the full range of adjustment. Furthermore, stabilization plate 53 must be spaced at least 14 inches from actuator plate 32 (preferably at a somewhat greater distance to allow the electrical cable to coil as described below) since these members are on opposite sides of bearing plate 55. Also, if stabilization plate 53 and actuator plate 32 are separated by 14 inches, bearing plate 54 must be at least 14 inches from bearing plate 55 and end plate 24 must be at least 14 inches from stabilization plate 53. It is apparent that any changes in the distance through which the microscope is adjustable will necessitate changes in the spacings between the other interrelated members within column 13.

Provisions have been made for safely guiding the necessary electrical cables up through adjustable column 13 into the top portion of the instrument. As shown in FIG. 2, a protective tube 63, which may be made of aluminum or plastic, extends downward from bearing plate 55 through holes in actuator plate 46 and mounting plate 34 to a point below clutch 37. The electrical cable 64 runs from the power unit (not shown) within base member 12, around motor 27 and into tube 63. It emerges from tube 63 at the top of bearing plate 55 and hangs freely between bearing plate 55 and stabilization plate 53 to which it is secured by clamp 65. Cable 64 then passes through central openings in stabilization plate 53, bearing plate 54 and cylinder 26 into projection arms 16 and 17, where it is securely held for the proper connections as needed. It may be appreciated that the electrical cable is kept away from the rotating elements, including the clutch and the spindle, and is allowed to move only between bearing plate 55 and stabilization plate 53. When the microscope is at its full height, cable 64 will extend nearly vertically between the upper end of tube 63 and clamp 65, while it is allowed to fall or coil, as it will, when the top of the microscope is lowered. There is nothing in this space which could catch or in any way endanger the cable as it coils or extends.

The ophthalmic microscope described herein has all of the characteristics previously indicated to be desirable for such an instrument. It is stable during surgical use, fully portable upon its base, is easily adjusted for height above the operating area and for focusing purposes. With a height adjustment range of 14 inches, a surgeon may use the microscope in either standing or sitting position. The height adjusting mechanism is simple and operates positively and smoothly. The optical elements are mounted on a compound swivel projection means so that there is a large amount of flexibility of position of the microscope even when the base has been properly positioned.

Although adjustable support column 13 is shown as having a circular cross section, this is not necessary. The shape could be hexagonal or octagonal, for example, if desired. However, a circular configuration is more economical to manufacture and provides a pleasant and unobtrusive appearance. Any change in the cross-sectional shape of the support member would require a similar change in some of the various plates and members disposed therein so that they conform relatively closely to the interior shape of the support member.

It is also possible that a different number of rods 33 could be used, a number ranging from one to more than three. However, the advantages of using three such rods are several, including resistance to twisting and consequent freedom from binding, plus a high degree of rigidity providing the impression of sturdiness and unity of structure. The particular combination of bearing plates alternated with actuator plate, stabilization plate and end plate, together with rods 33, forms an elongated adjustable structure which is efficient, reliable, stable and extremely resistant to torsion and other deformative forces.

Many unexpected advantages can be derived in the practice of the present invention. For example, it may be appreciated that the specific means described above operates in a relatively simple and uncomplicated fashion compared to a hydraulic system, a means routinely employed to adjust the overall height of support members. Moreover, the structural elements of the means to adjust the overall height of the support column are relatively light in weight when compared to the elements of a hydraulic system. However, the elements of the support column of the present invention are arranged in a fashion which imparts rigidity and stability to the structure. An important feature of the invention is that with the novel combination provided, adjustment of the height of the microscope also functions to focus the optical components of the microscope.

Having described the invention together with preferred embodiments thereof, as well as manners of practicing same, it is likely that modifications and improvements will now occur to those skilled in this art which are within the scope of the invention.

What is claimed is:

1. A microscope for surgical use having optical components adjustably mounted above the operating area, said microscope comprising:
   a base member;
   means remote from said base member for suspending the optical components of said microscope above the operating area; and
   support means connecting said suspending means to said base member, said support means being capable of adjusting the distance between said base member and said suspending means between predetermined limits, said support means comprising:
   a first column member secured to said base member;
   a second column member secured to said suspending means, said second column member being arranged in telescopic coaxial relationship with said first column member;
   motive means secured to said first column member; and
   means coupled at one end to said motive means and secured at the other end to said second column member for extending and retracting said second column member with respect to said first column member; wherein
   said motive means comprises:
     a motor secured to said first column member;
     a threaded spindle coupled to said motor for rotation therewith, said spindle extending into said first column member;
     an end plate mounted in said second column member;
     a plurality of parallel elongated rods, each secured at one end to said end plate and extending into said first column member;
     an actuator plate secured to the other end of each of said elongated rods, said actuator plate being provided with internal threads for engaging said spindle in threaded relationship;
     whereby upon rotation of said motor in one direction said second column member is extended with respect to said first column member and whereby upon rotation of said motor in the opposite direction said second column member is retracted with respect to said first member.

2. The microscope recited in claim 1, wherein:
   said support means further comprises:
   a stabilization member secured to said elongated rods intermediate their ends; and
   a plurality of bearing members secured to said first column member intermediate the ends of said elongated rods, said bearing members being provided with a plurality of openings through which said elongated rods slide, a first bearing member residing on one side of said stabilization member and a second bearing member residing on the other side of said stabilization member.

3. The microscope recited in claim 2, and further comprising:
   a mounting plate secured within said first column member, said motor being secured to said mounting plate;
   a spindle bearing mounted in said mounting plate; and
   a guide bushing mounted in said first bearing member;
   said spindle being rotatably mounted between said spindle bearing and said guide bushing.

4. The microscope recited in claim 3, wherein:
   said first bearing member is located between and spaced a predetermined distance from said mounting plate and said second bearing member;
   said stabilization member is located between and spaced said predetermined distance from said actuator plate and said end plate;
   the distance between said base member and said suspending means being adjustable through a range which is substantially equal to said predetermined distance.

5. The microscope recited in claim 3, wherein:
   said end plate, second bearing member and stabilization member are each provided with an axial opening; and
   said first bearing member, actuator plate and mounting plate are each provided with an off-axis opening;
   said openings being adapted for guidance of electrical cables extending between said base member and said optical components.

6. For use in a surgical microscope having optical components, a base member and means remote from said base member for suspending said optical components above the operating area, an adjustable support column comprising:
  a first column member secured to said base member;
  a second column member secured to said suspending means and arranged in adjustable telescopic coaxial relationship with said first column member;
  a mounting plate secured within said first column member;
  a reversible motor secured to said mounting plate;
  a threaded spindle axially located within said first column member and coupled to said motor for rotation therewith;
  an end plate secured to said second column member;
  three parallel elongated rods, each secured at one end to said end plate, said elongated rods being equiangularly arranged about the axis of said support column;
  an actuator plate secured to the other end of each of said elongated rods;
  an actuator nut mounted in said actuator plate and engaging said spindle in threaded relationship;
  a first bearing member secured within said first column member at a predetermined distance from said mounting plate;
  a second bearing member secured within said first column member at said predetermined distance from said first bearing member;
  a stabilization member secured to said elongated rods intermediate their ends and spaced at said predetermined distance from said actuator plate and from said end plate;
  a spindle bearing mounted in said mounting plate; and
  a guide bushing mounted in said first bearing member;
  said spindle being rotatably mounted between said spindle bearing and said guide bushing.